(12) United States Patent
Buisson et al.

(10) Patent No.: US 12,008,061 B2
(45) Date of Patent: Jun. 11, 2024

(54) METHOD OF COMMUNICATION OF INFORMATION

(71) Applicant: STMicroelectronics (Grenoble 2) SAS, Grenoble (FR)

(72) Inventors: Remi Buisson, Sassenage (FR); Sophie Maurice, Meylan (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 30 days.

(21) Appl. No.: 17/661,368

(22) Filed: Apr. 29, 2022

(65) Prior Publication Data
US 2022/0366000 A1 Nov. 17, 2022

(30) Foreign Application Priority Data
May 11, 2021 (FR) .................................... 2104953

(51) Int. Cl.
*H04W 12/47* (2021.01)
*G06F 16/33* (2019.01)
*G06F 16/955* (2019.01)

(52) U.S. Cl.
CPC ...... *G06F 16/9566* (2019.01); *G06F 16/3335* (2019.01); *G06F 16/9558* (2019.01)

(58) Field of Classification Search
None
See application file for complete search history.

(56) References Cited

U.S. PATENT DOCUMENTS

| 10,115,243 | B2 | 10/2018 | Gallo et al. | |
| 11,232,272 | B2* | 1/2022 | Rule | G06Q 20/3415 |
| 11,438,164 | B2* | 9/2022 | Rule | H04L 9/0866 |
| 11,482,312 | B2* | 10/2022 | Osborn | H04L 63/0442 |
| 2012/0150687 | A1* | 6/2012 | Hart | G06Q 30/0613 705/26.41 |
| 2013/0314214 | A1* | 11/2013 | Leica | H04W 4/80 340/10.1 |
| 2016/0198287 | A1* | 7/2016 | Hulusi | H04M 11/025 455/41.1 |
| 2016/0239733 | A1* | 8/2016 | Hertz | H04W 4/029 |
| 2017/0270323 | A1* | 9/2017 | Butler | G06K 19/07749 |
| 2019/0245584 | A1 | 8/2019 | Wuidart et al. | |
| 2019/0377912 | A1* | 12/2019 | Duggan | G06K 7/10099 |
| 2021/0036856 | A1* | 2/2021 | Wang | H04L 9/0894 |

(Continued)

FOREIGN PATENT DOCUMENTS

GB 2516154 A 1/2015

OTHER PUBLICATIONS

Anonymous "Is there an encryption scheme that is url-safe and compact?," https://crypto.stackexchange.com/questions/89375/is-there-an-encryption-scheme-t hat-is-url-safe-and-compact, Nov. 18, 2021, 5 pages.

(Continued)

*Primary Examiner* — Phuoc H Nguyen
(74) *Attorney, Agent, or Firm* — Slater Matsil, LLP

(57) ABSTRACT

The present disclosure relates to a method for communicating between an electronic tag and a computer connected to the internet, wherein the electronic tag: encrypts at least part of the information to be transmitted, using a data format preserving algorithm; generates a URL comprising at least the encrypted part of the information; and transmits the URL to an NFC reader.

19 Claims, 3 Drawing Sheets

(56) References Cited

U.S. PATENT DOCUMENTS

| | | | |
|---|---|---|---|
| 2021/0111873 A1* | 4/2021 | Varanasi | H04L 9/0668 |
| 2021/0319427 A1* | 10/2021 | Rule | G06Q 20/3829 |
| 2022/0076323 A1* | 3/2022 | Angeli | G06Q 20/085 |
| 2022/0247741 A1* | 8/2022 | Moreton | H04L 9/3226 |
| 2022/0366000 A1* | 11/2022 | Buisson | H04L 9/0618 |

OTHER PUBLICATIONS

Sotero, "Format Preserving Encryption," FPE Dynamic Tweak, Datasheet, Sep. 8, 2020, 4 pages.

\* cited by examiner

METHOD OF COMMUNICATION OF INFORMATION

CROSS-REFERENCE TO RELATED APPLICATIONS

This application claims priority to French Application No. 2104953, filed on May 11, 2021, which application is incorporated by reference herein in its entirety.

TECHNICAL FIELD

The present disclosure generally relates to the communication of a Uniform Resource Locator (URL) and, more particularly, to the communication of an encrypted URL.

BACKGROUND

The development of the internet in recent years has led to the proliferation of data of all formats, such as documents, images, sounds, etc., stored on servers. Some of this data is directly accessible via a URL corresponding to an access path that may be an internet address.

There is a need for improved URL communications.

SUMMARY

One embodiment addresses all or some of the drawbacks of URL communications.

One embodiment provides for a method for communication between an electronic tag and a computer connected to the internet, wherein the electronic tag: encrypts at least part of the information to be transmitted, by using a format preservation algorithm; generates a URL comprising at least the encrypted part of the information; and transmits the URL to an NFC reader.

Another embodiment provides for a system comprising an electronic tag and a computer connected to the internet, the tag being adapted to encrypt at least part of the information to be transmitted, by using a format preservation algorithm, to generate a URL comprising at least the encrypted information, and to transmit the URL to an NFC reader.

According to one embodiment, the NFC reader accesses the computer via the internet, based on the URL.

According to one embodiment, the encryption of the information to be transmitted is performed by an FF1 algorithm.

According to one embodiment, the encrypted part of the information is in ASCII printable characters.

According to one embodiment, the ASCII printable characters comprise at least the following characters: "a", "b", "c", "d", "e", "f", "g", "h", "i", "j", "k", "l", "m", "n", "o", "p", "q", "r", "s", "t", "u", "v", "w", "x", "y", "z", "A", "B", "C", "D", "E", "F", "G", "H", "I", "J", "K", "L", "M", "N", "O", "P", "Q", "R", "S", "T", "U", "U", "V", "W", "X", "Y", "Z", "0", "1", "2", "3", "4", "5", "6", "7", "8" and "9".

According to one embodiment, the ASCII printable characters include at least the following characters: "−", "_", "." and "~".

It is noted that the ASCII printable characters above are separated by a comma outside of the quotation, which is unconventional in the English language, but this is to illustrate the specific characters are ASCII printable characters and not the characters with a comma suffix.

According to one embodiment, the computer is adapted to decrypt and possibly interpret the encrypted part of the information.

According to one embodiment, the encrypted part of the information corresponds to internal data of the tag, data which may be static or may be modified by the tag itself.

According to one embodiment, the computer is adapted to send a response to the reader.

According to one embodiment, the URL comprises successively a protocol, a domain name and the encrypted part of the information.

According to one embodiment, the encrypted part of the information is preceded in the URL by an "=" character.

Another embodiment provides for an electronic tag adapted to implement the method as described above.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
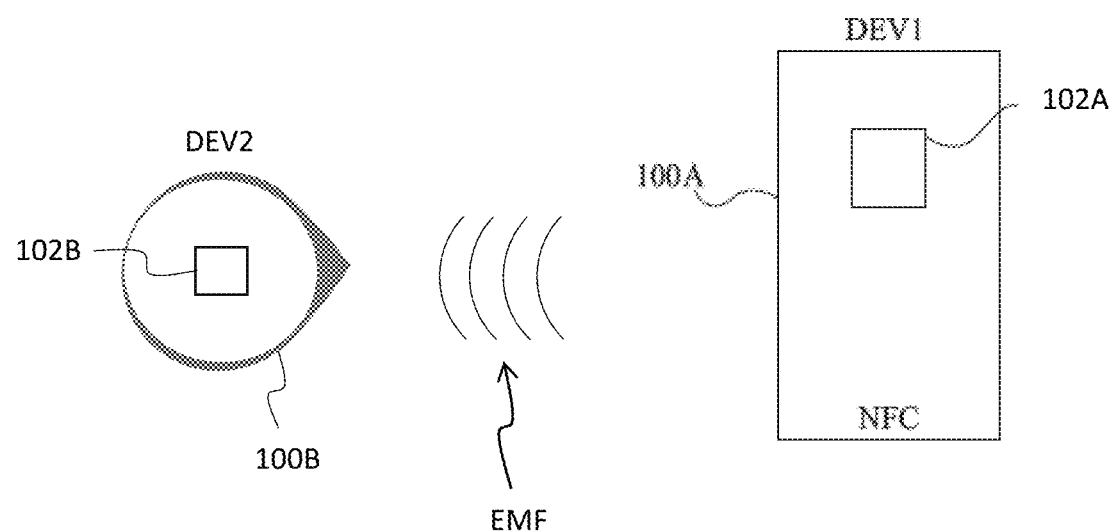
FIG. 1 illustrates a diagram of an embodiment near field communication system.

Like features have been designated by like references in the various figures. In particular, the common structural or functional features among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Throughout the development of connected devices, data exchange has been facilitated. As an example, a simple code such as a QR code, when read, opens a URL in a web browser pointing to data. Data can also be exchanged by Bluetooth, by near field communication (NFC), by internet, etc.

This ease of exchange gives rise to problems of confidentiality and security of the data in question.

In certain applications, one seeks to transmit data in a URL, between an electronic tag and a computer or server connected to the internet via an NFC reader such as a telephone configured in read mode. It may then be desirable to transmit that part of this data corresponding to the data to be secured, without the NFC reader being aware of its content. In other words, it would be desirable to be able to use an NFC reader as a communication gateway between an electronic tag and a remote server or remote computer device, without the NFC reader having access to at least part of the transmitted data.

Before communicating it to the NFC reader, it might be considered to encrypt the entire URL at the tag level. But this would require the reader to be capable of decrypting at least the part of the URL that points to the remote server and thus need this NFC reader to share an encryption/decryption mechanism with the tag. However, this would prevent some NFC readers from being used as a communication vector between an electronic tag and a server. In other words, the NFC reader would have to be modified to include a decryption element.

The described embodiments provide for encrypting only the part of the URL including the data to be secured so that the domain name of the URL remains unencrypted and thus readable by the NFC reader.

To make this URL encryption, the use of conventional binary encryption algorithms, applying them to the URL data to be secured, might be considered.

However, a URL can only be used if it contains only characters of the American Standard Code for Information Interchange (ASCII), in addition to characters from a predefined set. The electronic tag would therefore have to be able to convert the binary encrypted data into ASCII characters before transferring the tag URL to the NFC reader. This would require the inclusion of a conversion element in the electronic tag, in addition to the encryption element.

To overcome these problems, directly encrypting the part of the URL containing the data to be secured in ASCII characters is provided. Since this part of the URL (hereafter called plaintext) is in ASCII, an encryption algorithm with the preservation of format is provided. The encryption is performed directly by the tag, and the decryption is performed by the computer so that the NFC reader cannot access the encrypted data.

FIG. 1 shows one example near field communication system of the type to which the described embodiments and implementation modes apply, by way of example, schematically and in block form.

The case of two different electronic devices, such as a cell phone (or "smartphone") and an electronic tag, is taken arbitrarily, but what is described applies more generally to any system in which a reader, terminal, or other device emits an electromagnetic field that an electronic card can pick up. For simplicity, NFC devices will refer to any electronic devices that incorporate one or more near field communication (NFC) circuits.

In the example shown, a first NFC device 100A (DEV1), a cell phone operating in "read mode," is capable of communicating by near field electromagnetic (EMF) coupling with a second NFC device 100B (DEV2), an electronic tag in this case, or a device in the "map" mode.

Each NFC device 100A-B incorporates a near field communication circuit, symbolized by a block 102A-B in FIG. 1. The near field communication circuits 102A-B each include various electronic elements or circuits for generating or detecting a radio frequency signal by using an antenna (not shown), such as modulation or demodulation circuits.

Figure 2:
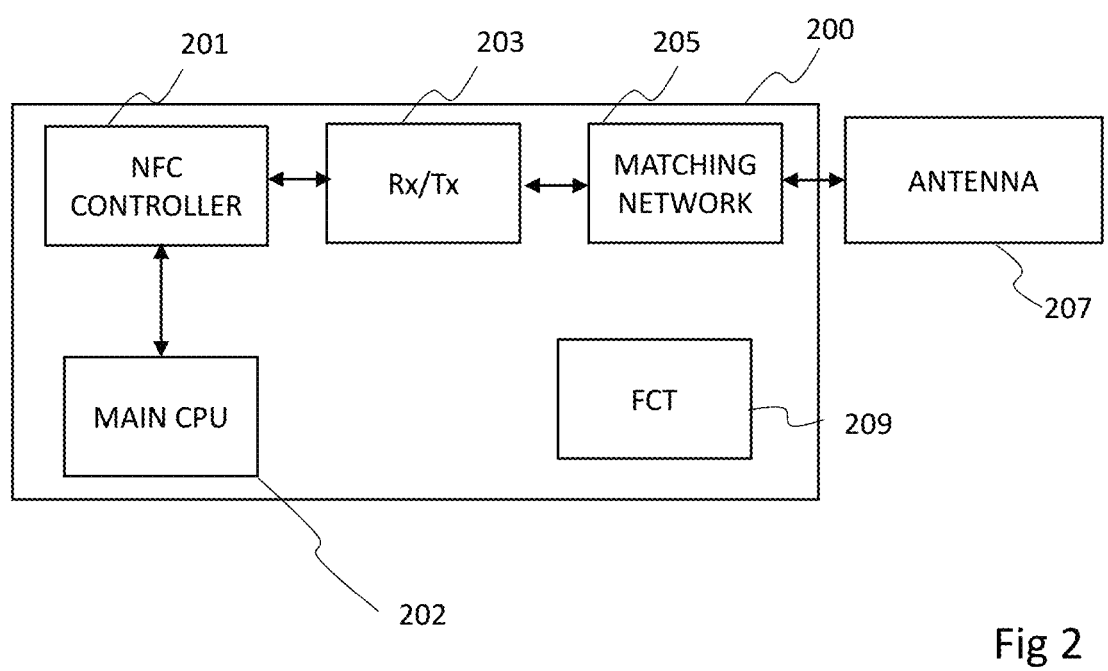
FIG. 2 illustrates a diagram of an embodiment near field communication circuit.

FIG. 2 shows one example of a near field communication circuit 200, schematically and in block form. Such a circuit is generally included in a device of the type of device 100A of FIG. 1 and may also be included in device 100B, particularly if it is a map-mode device. Listed as device 100B, if an electronic tag, its circuits are conventionally simplified, as compared to the circuits 200.

In the example shown, circuit 200 includes a near field communication (NFC) controller 201, or NFC controller. For example, the NFC controller 201 is a microchip or electronic circuit adapted to implement near field communications.

The NFC controller 201 is connected to a central processing unit 202 (MAIN CPU) in the example shown. The main CPU 202 is the CPU of the NFC device 100A-B, for example, and, in practice, is generally a microcontroller.

The NFC controller 201 is connected to a receive/transmit (Rx/Tx) circuit 203 or radio frequency head in the example shown. According to one embodiment, controller 201 and circuit 203 are part of the same integrated circuit. Circuit 203 is connected to an impedance matching circuit or network 205 (MATCHING NETWORK) having discrete external components, which itself is connected to an antenna 207 (ANTENNA).

Circuit 203 is adapted to convert digital signals at the NFC controller end to modulated analog signals at the antenna end and vice versa. The impedance matching circuit 205 is typically configured to maximize the amplitude of signals that may be transmitted or received by the NFC controller 201. In general, circuit 205 is specifically designed to match the electrical properties of antenna 207.

The near field communication circuit 200 may further include other elements, such as one or more volatile or non-volatile memories, or various circuits that implement additional functions, symbolized in FIG. 2 by a single block 209 (FCT).

During communication between the NFC device 100A and NFC device 100B (FIG. 1), the radio frequency signal or electromagnetic field (EMF) generated by the NFC device 100A is picked up by the other NFC device 100B within range.

Figure 3:
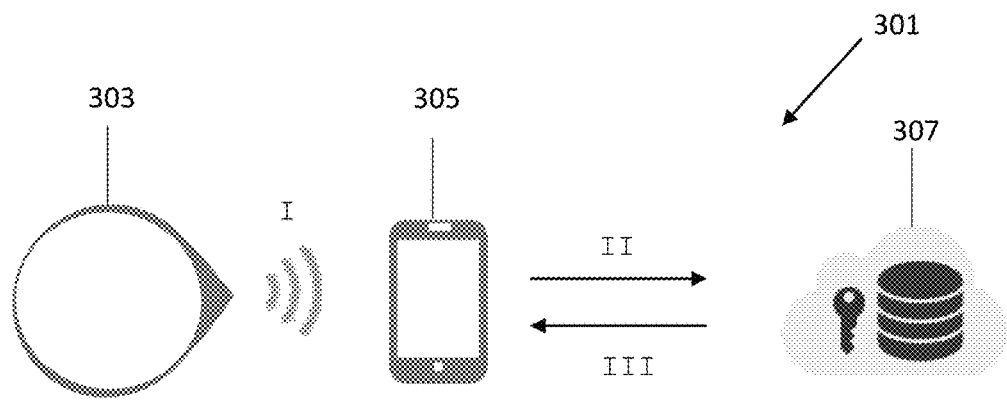
FIG. 3 illustrates a diagram of an embodiment of the near field communication system as illustrated in FIG. 1.

FIG. 3 shows one embodiment of the communication system 301 shown in FIG. 1, schematically and in block form. System 301 includes an NFC electronic tag 303, communicating with a remote server or remote computing device or remote computer connected to the internet 307 via an NFC reader 305. The tag 303 and the reader 305 preferably correspond to the tag 100B and the reader 100A, respectively, as shown in FIG. 1.

According to one embodiment, the electronic tag 303 is a tag that extracts the energy necessary for its operation from a radio frequency field emitted by a reader within the range of which it is located.

According to one embodiment, the reader 305 is a phone or connected device such as a connected tablet, watch, computer, etc., that has functions suitable for connecting to the internet.

The embodiment illustrated in FIG. 3 provides that tag 303 can communicate information to server 307. As such, the tag 303 encrypts at least part of the information to be transmitted, generates a URL comprising at least the encrypted part of the information, and transmits (I) the URL to the NFC reader 305.

According to the embodiment illustrated in FIG. 3, the NFC reader 305 acts as a communication vector between tag 303 and server 307. In particular, the NFC reader 305 does not decrypt the encrypted part of the information in the URL transmitted to it. However, reader 305 is adapted to recognize the encrypted part, particularly the URL that contains the name of server 307 to which the information is intended. Reader 305 then receives the URL from tag 303, recognizes the name of server 307, and accesses server 307 (II) by opening the URL in a web browser.

According to the embodiment illustrated in FIG. 3, server 307 is adapted to decrypt and optionally interpret the encrypted part of the information contained in the URL. In embodiments, following the decryption and interpretation of the encrypted part of the information contained in the URL, server 307 is adapted to send and sends a response (III) to reader 305. This response may be a message to be communicated to the user of reader 305 via his/her display screen.

For example, the response from server 307 to reader 305 corresponds to the opening or downloading of a file, an image, a video, or the like.

Figure 4:
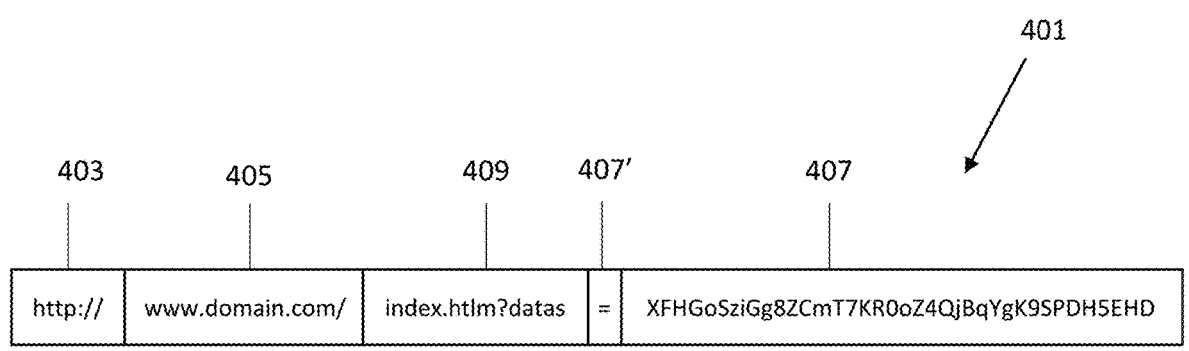
FIG. 4 illustrates an embodiment URL.

FIG. 4 shows an example of a URL 401. According to the embodiment shown in FIG. 4, the URL 401 includes at least: a communication protocol identifier 403 (http://) on the web; a field 405 (www.domain.com/) containing the domain name; and an encrypted part 407 (XFHGoSziGg8ZCmT7KRooZ4QjBqYgK9SPDH5EHD).

The identifier 403 facilitates indicating the protocol to be used to retrieve the content targeted by the URL to the internet browser. For example, the protocol corresponds to (http://) for a general internet search or to (https://) for a search that follows a secure protocol. The protocol can also correspond to (mailto:) for opening an electronic mailbox or (ftp:) for a file transfer.

Field 405 contains the name of the internet server or computer that hosts the content targeted by the URL. Typically, the field 405 comprises a top-level domain name or extension (".com" in the example shown in FIG. 4) preceded by a sub-domain name or second-level domain ("domain" in the example shown in FIG. 4) and the indication "www.", if applicable.

According to one embodiment, the field 405 is an internet protocol (IP) address.

The URL may include a part 409 (index.html?datas) between the field 405 and the encrypted part 407, for example, corresponding to a path to access the content targeted by the URL or parameters or anchor, etc. in the server 307.

For example, in part 409, "index.htm" corresponds to a path to access the resource, "?" is a separator, and "datas=xxxxx" is an optional data or query string. More generally, several queries separated by "&" can form the query string.

According to the embodiment illustrated in FIG. 4, encrypted part 407 is preceded by a character 407', to indicate the beginning of the same part. For example, the encrypted part 407 is preceded by an "=" character.

TABLE 1

|   | Characters |
|---|---|
| A | a b c d e f g h i j k l m n o p q r s t u v w x y z A B C D E F G H I J K L M N O P Q R S T U V W X Y Z 0 1 2 3 4 5 6 7 8 9 |
| B | - _ . ~ |
| C | ! * ` ( ) ; : @ & = + $ , / ? % # [ ] |

The encrypted part 407 corresponds to an ASCII character sequence, for example, and, more particularly, to a printable ASCII character sequence.

According to one embodiment, the printable ASCII characters are the characters of line A of Table 1, at least, preferably limited to the list of characters of line A of Table 1.

According to another embodiment, the printable ASCII characters are the characters in row B of Table 1, at least, preferably limited to the list of characters in row B of Table 1.

In a variant, the printable ASCII characters are the characters in rows A and B of Table 1, at least, preferably limited to the list of characters in rows A and B of Table 1.

Figure 5:
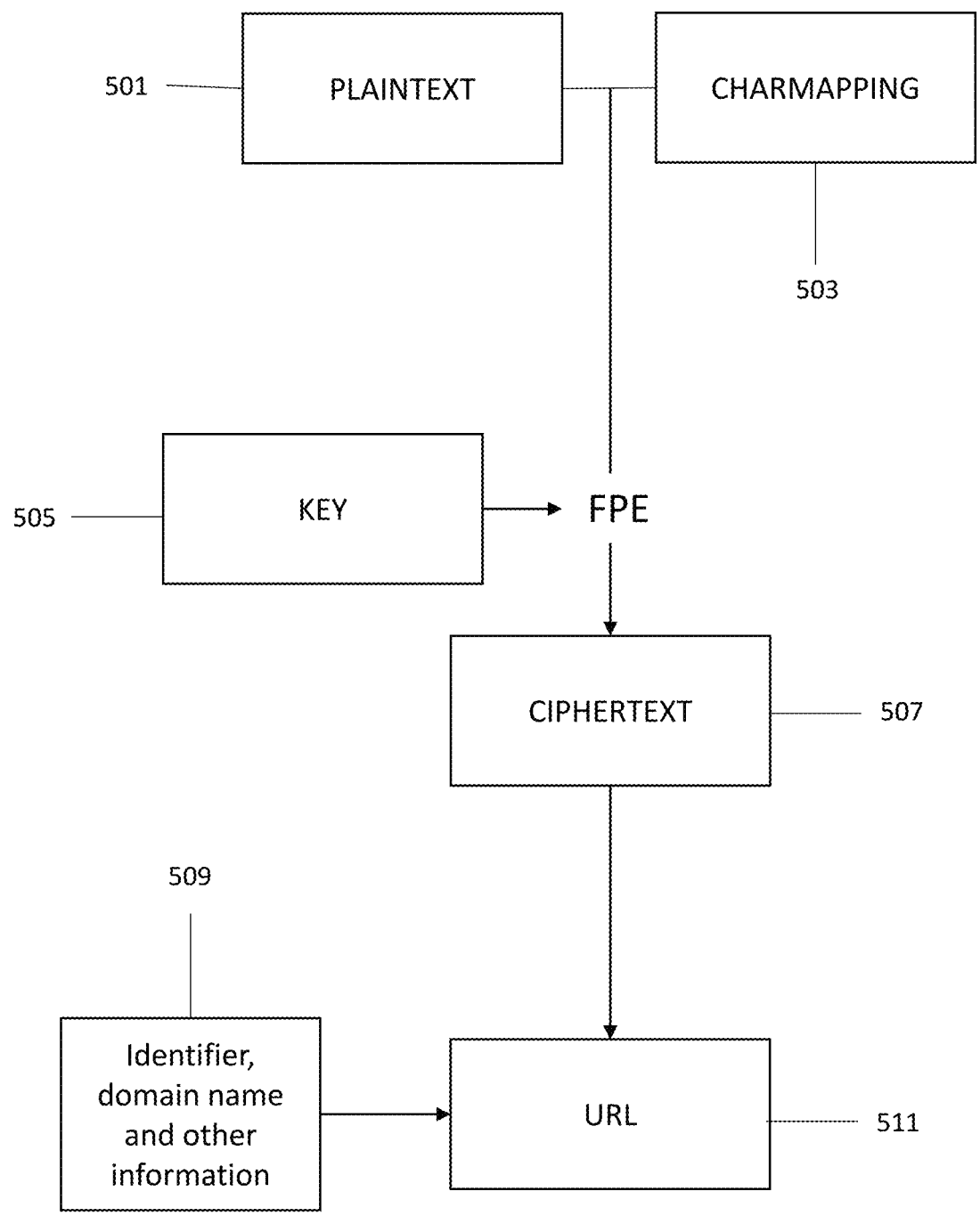
FIG. 5 illustrates a flow chart of an embodiment method for constructing the URL illustrated in FIG. 4.

The URL as shown in FIG. 4 is constructed by following the method shown in FIG. 5.

FIG. 5 shows one embodiment of a method for constructing the URL illustrated in FIG. 4, schematically and in block form. The flowchart illustrated in FIG. 5 enables the URL 401 to be constructed as illustrated in FIG. 4, from the information to be transmitted, inter alia.

Construction of the URL begins with a step during which part of the information to be transferred (the information to be secured) is generated and assembled by the NFC electronic tag to form a sequence of characters known as plaintext 501.

The plaintext 501 is preferably in printable ASCII characters such as the characters in row A of Table 1 at least, preferably only the characters in row A of Table 1, or, in a variant, the characters in rows A and B of Table 1 at least, preferably only the characters in rows A and B, but does not comprise any character from row C of Table 1.

In a variant, the plaintext 501 is generated by a device within the tag 303.

The information to be secured is data relating to an identification number, a product identification number attached to the tag or a unique identification number of the tag, for example, or internal tag data such as a tag diagnostic and status data such as a counter, timestamp, error or status recovery.

In embodiments, the tag does not necessarily generate the same URL and may vary the plaintext from one URL to another. The plaintext 501 depends on the date, time, counter, or the like.

The plaintext 501 corresponds to the respective ASCII codes of the individual characters that comprise it, preferably combined with a mapping table 503 (CHARMAPPING) linked to the algorithm for subsequent steps.

An algorithm (FPE) is then applied to encrypt the plaintext 501 by a key 505 (KEY). A sequence of encrypted codes 507 (CIPHERTEXT) is obtained. The algorithm used for the encryption corresponds to a format preservation algorithm or algorithm that preserves the data format (FPE, for "Format Preserving Encryption"). Thus, the sequence of encrypted codes 507 corresponds to a printable ASCII character sequence, as defined above. The algorithm used corresponds to an FF1 algorithm, for example.

The key 505 may or may not be common to several tags and be shared with the remote server 307.

The tag 303 generates plaintext 501 corresponding to the character sequence: "0123456x0123456xhelloworld," for example. Each character of the text 501 is related to a numerical value in Table 503: "0 1 2 3 4 5 6 59 0 1 2 3 4 5 6 59 43 40 47 50 58 50 53 47 39". Encryption by an FF1 algorithm using a key 505 "00 01 02 03 04 05 06 07 08 09 0a 0b 0c 0d 0e of 10 11 12 13 14 15 16 17 18 19 is 1a 1b 1c 1d 1e 1f" makes it possible to obtain the encrypted code sequence 507: "HGoSziGg8ZCmT7KR00Z4QjBqYg".

Finally, the encrypted code sequence 507 is joined to an unencrypted pall 509 to form the URL 511 (URL). For example, the unencrypted part comprises the identifier, domain name, and other related information such as a path or anchor (identifier, domain name, and other information).

It should be noted that the described embodiments can be applied to a tag containing the encrypted URL in non-volatile memory (or via a fuse-like structure). This particular embodiment applies to tags corresponding to coupons, for example.

An advantage of the described embodiments and modes of implementation is that they allow data present in a URL to be transmitted between an electronic tag and a server via an NFC reader without the reader having knowledge of the data.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   encrypting, by an electronic tag, information to be transmitted between the electronic tag and an internet-connected computing device using a format preservation algorithm, the information comprising an encrypted portion, the encrypted portion comprising data modified by the electronic tag, the encrypted portion consisting of American Standard Code for Information Interchange (ASCII) printable character, the ASCII printable characters consists of a combination of two or more of the following characters: "a", "b", "c", "d", "e", "f", "g", "h", "i", "j", "k", "l", "m", "n", "o", "p", "q", "r", "s", "t", "u", "v", "w", "x", "y", "z", "A", "B", "C", "D", "E", "F", "G", "H", "I", "J", "K", "L", "M", "N", "O", "P", "Q", "R", "S", "T", "U", "U", "V", "W", "X", "Y", "Z", "0", "1", "2", "3", "4", "5", "6", "7", "8" and "9";
   generating, by the electronic tag, a Uniform Resource Locator (URL), the URL comprising at least the encrypted portion;
   transmitting, by the electronic tag, the URL to a near field communication (NFC) reader;
   receiving, by the internet-connected computing device, the encrypted portion;
   decrypting, by the internet-connected computing device, the encrypted portion to generate a decrypted portion; and
   interpreting, by the internet-connected computing device, the decrypted portion.

2. The method of claim 1, wherein the NFC reader accesses the internet-connected computing device via the internet in accordance with the URL.

3. The method of claim 1, wherein the encrypted portion is encrypted in accordance with an FF1 algorithm.

4. The method of claim 1, further comprising transmitting, by the internet-connected computing device, a response to the NFC reader.

5. The method of claim 1, wherein the URL successively comprises a protocol portion, a domain name portion and the encrypted portion.

6. The method of claim 1, wherein the encrypted portion is preceded by a "=" character.

7. The method of claim 1, wherein the URL comprises a communication protocol identifier indicating a communication protocol to retrieve content targeted by the URL, the communication protocol identifier corresponding to a file transfer or opening an electronic mailbox.

8. The method of claim 1, wherein the URL comprises a communication protocol identifier indicating a communication protocol to retrieve content targeted by the URL, the communication protocol identifier corresponding to a file transfer or opening an electronic mailbox, wherein the encrypted portion is encrypted in accordance with an FF1 algorithm, and wherein the encrypted portion comprises data relating to a tag diagnostic and status data.

9. A system, comprising:
   an electronic tag configured to:
      encrypt information using a format preservation algorithm, the information comprising an encrypted portion, the encrypted portion being limited to two or more combinations of lower- or upper-case English Alphabet characters and integer numbers '0' through '9',
      generate a Uniform Resource Locator (URL), the URL comprising at least the encrypted portion, and
      transmit the URL to a near field communication (NFC) reader; and
   an internet-connected computing device is configured to:
      receive the encrypted portion,
      decrypt the encrypted portion to generate a decrypted portion, and
      interpret the decrypted portion.

10. The system of claim 9, wherein the NFC reader accesses the internet-connected computing device via the internet in accordance with the URL.

11. The system of claim 9, wherein the URL successively comprises a protocol portion, a domain name portion and the encrypted portion.

12. The system of claim 9, wherein the encrypted portion is encrypted in accordance with an FF1 algorithm.

13. The system of claim 9, wherein the URL comprises a communication protocol identifier indicating a communication protocol to retrieve content targeted by the URL, the communication protocol identifier corresponding to a file transfer or opening an electronic mailbox.

14. The system of claim 9, wherein the encrypted portion is preceded by a "=" character.

15. An electronic tag, configured to:
encrypt information to be transmitted between the electronic tag and an internet-connected computing device using a format preservation algorithm, the information comprising an encrypted portion, the format preservation algorithm being in accordance with an FF1 algorithm, the encrypted portion being limited to two or more combinations of lower- or upper-case English Alphabet characters and integer numbers '0' through '9';
generate a Uniform Resource Locator (URL), the URL comprising at least the encrypted portion; and
transmit the URL to a near field communication (NFC) reader such that the internet-connected computing device decrypts the encrypted portion to generate a decrypted portion.

16. The electronic tag of claim 15, wherein the NFC reader accesses the internet-connected computing device via the internet in accordance with the URL.

17. The electronic tag of claim 15, wherein the encrypted portion consists of American Standard Code for Information Interchange (ASCII) printable characters.

18. The electronic tag of claim 15, wherein the URL successively comprises a protocol portion, a domain name portion and the encrypted portion.

19. The electronic tag of claim 15, wherein the encrypted portion is preceded by a "=" character.

* * * * *